United States Patent [19]

Wilke et al.

[11] 4,346,649
[45] Aug. 31, 1982

[54] DOUGHNUT MAKING MACHINE AND IMPROVEMENTS THEREON

[75] Inventors: Wilbur D. Wilke, Camano Island; Archie A. Hodge, Renton; Thomas E. Belshaw; John R. Hamblin, both of Seattle, all of Wash.

[73] Assignee: Belshaw Bros., Inc., Seattle, Wash.

[21] Appl. No.: 144,684

[22] Filed: Apr. 28, 1980

[51] Int. Cl.$^3$ .............................................. A47J 37/12
[52] U.S. Cl. ....................................... 99/337; 99/344; 99/354; 99/404; 99/407; 198/815; 425/288; 474/132
[58] Field of Search ................ 474/132; 198/815, 813, 198/814, 856, 573; 425/190, 287, 288; 99/403, 404, 405, 406, 407, 354, 337, 344

[56] References Cited

U.S. PATENT DOCUMENTS

| Re. 25,215 | 8/1962 | James | 198/856 |
| 375,673 | 12/1887 | Funk | 474/132 |
| 2,652,914 | 9/1953 | Christensen | 198/573 |
| 2,794,897 | 6/1957 | Giles | 99/403 |
| 2,957,572 | 10/1960 | Dvorak | 198/813 |
| 3,504,619 | 4/1970 | Fester | 99/354 |
| 3,635,171 | 1/1972 | Schertz | 425/287 |
| 3,872,783 | 3/1975 | Fries | 99/354 |
| 3,963,115 | 6/1976 | Teske | 198/856 |

Primary Examiner—Billy J. Wilhite
Attorney, Agent, or Firm—Seed, Berry, Vernon & Baynham

[57] ABSTRACT

A miniature size doughnut fryer has a portable hopper easily removed from the frying machine and which is automatically positioned in an aligned cutting position when installed on the machine. An improved safety cut-out device is provided for a belt drive to assure that the doughnut conveyor stops in an overload condition but which signals the operator that the overload condition is existing. The drive and safety cut-out are provided housed within the heater housing adjacent the frying tank of the machine for ease of assembly and manufacturing cost. The heater element housing is mounted on pivots which allow easy pivotal removal of the heating elements from the frying tank as well as providing a wide stance support for the heating elements when pivoted out of the tank. The drive and control circuitry for the conveyor and the cutter head are interlocked to prevent repetitive cycling of the cutter head during a conveyor overload position. An improved dual head doughnut cutter is also provided.

11 Claims, 8 Drawing Figures

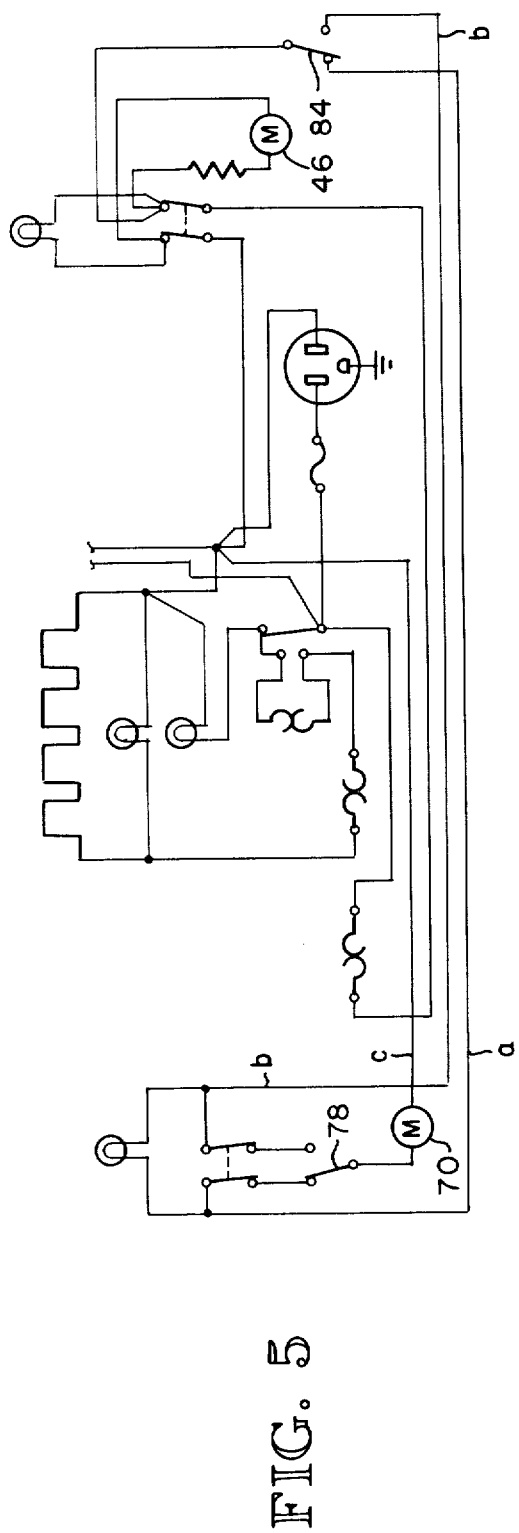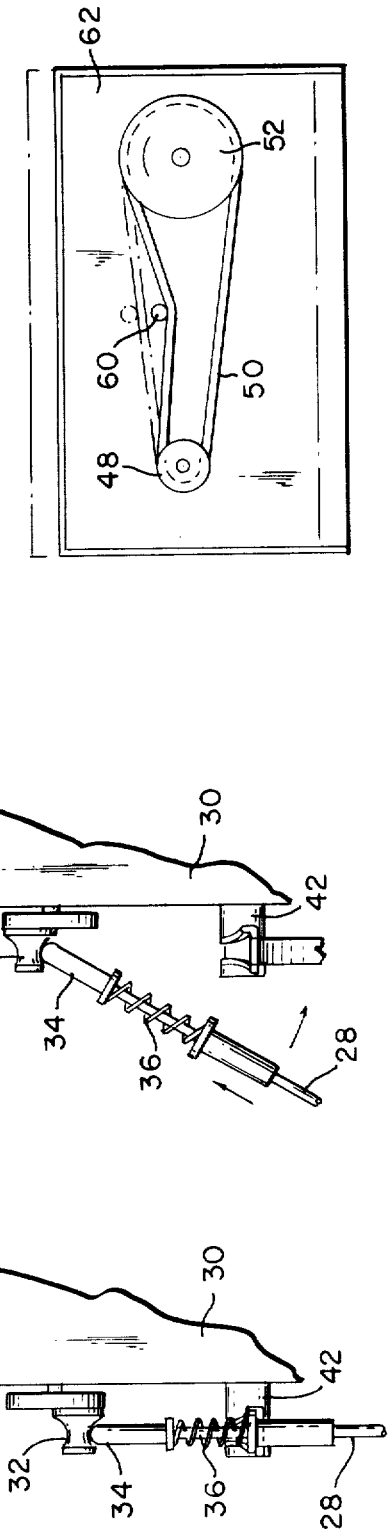

DOUGHNUT MAKING MACHINE AND IMPROVEMENTS THEREON

BACKGROUND OF THE INVENTION

1. Field of the Invention

This invention pertains to doughnut frying machines and, more particularly, to improvements in such doughnut frying machines and components thereof.

2. Description of the Prior Art

Heretofore doughnut machines have been extremely large and cumbersome to operate, rendering them either of little use for smaller production or too expensive for such smaller production quantities of doughnuts for the small retail outlet. Furthermore, the prior art doughnut machines have in some instances required highly skilled operators for cleaning and servicing. Still further, disassembly and cleaning of the machine which occurs during every 24-hour period also required a highly skilled operator.

SUMMARY OF THE INVENTION

It is an object of this invention to provide a small production size doughnut frying machine which is easy to operate and maintain.

It is another object of this invention to provide an improved safety cut-out device for a doughnut frying machine.

It is still another object of this invention to provide a doughnut frying machine which can be quickly and easily cleaned in a safe manner even while the machine still contains hot frying liquids.

Basically, these objects are obtained by several unique, independent features and by a combination of these features to provide an overall compact, easily cleaned and safe-to-operate doughnut frying machine.

One of these features basically includes a portable hopper which is provided with a bracket which positions the hopper relative to an eccentric drive on the frying machine. The hopper can then be removed and filled with doughnut mix and easily and quickly positioned on the frying machine with the drive in engagement with the cutting piston or plunger of the cutting head. This enables the operator to quickly resupply the machine with batter without loss of timing or alignment and in a minimum of lost production time.

Another feature of the invention is the use of a unique safety cut-out device for belt drives between driven and drive members in a doughnut machine. The cut-out device basically includes a tensioning roller which is biased against the belt between the driven and drive members and which upon an overload condition on the driven member will cause the tension roller to be pushed away from one of the members so that the belt slips on the member. Preferably, a cog belt is used such that the slippage of the belt on the cogged members will cause an audible chatter which can be detected by the operator, indicating that an overload condition exists. In the preferred embodiment the biasing means for the tensioning roller is a weighted cover plate with the biasing force being the force of gravity acting on the tension roller. During overload the increased tension in the upper run of the belt tends to raise the tensioning roller, allowing the belt to disengage from the driven member so that the drive is uncoupled from the driven member.

Still another feature of the invention is the positioning of the heater housing with its coils extending outwardly therefrom in proper alignment with the frying liquid tank. The heater housing which is quite heavy is separately supported in an outrigger-type of configuration and is pivotally mounted so that the heating coils can be pivoted up out of the heating tank for removal of the tank but remain in a stable well-supported and thus safe condition so that there is less likelihood of spilling the hot frying liquid and injuring an operator.

Another feature of the invention is the provision of multiple toroidal shaped doughnut forming heads in a doughnut machine both coupled to a common hopper. This allows the manufacture of smaller sized but double the quantity of doughnuts for smaller retail outlets.

BRIEF DESCRIPTION OF THE FIGURES OF THE DRAWINGS

FIG. 3A is a schematic illustration of the removable hopper portion of the machine in a position about to be installed;

FIG. 3B is a schematic operational view of the removable hopper portion of the machine;

FIG. 4 is a schematic illustration of a belt drive and safety cut-out mechanism of the machine;

FIG. 5 is a schematic electrical diagram embodying the principles of the invention.

DETAILED DESCRIPTION OF THE PREFERRED EMBODIMENTS

Figure 1:
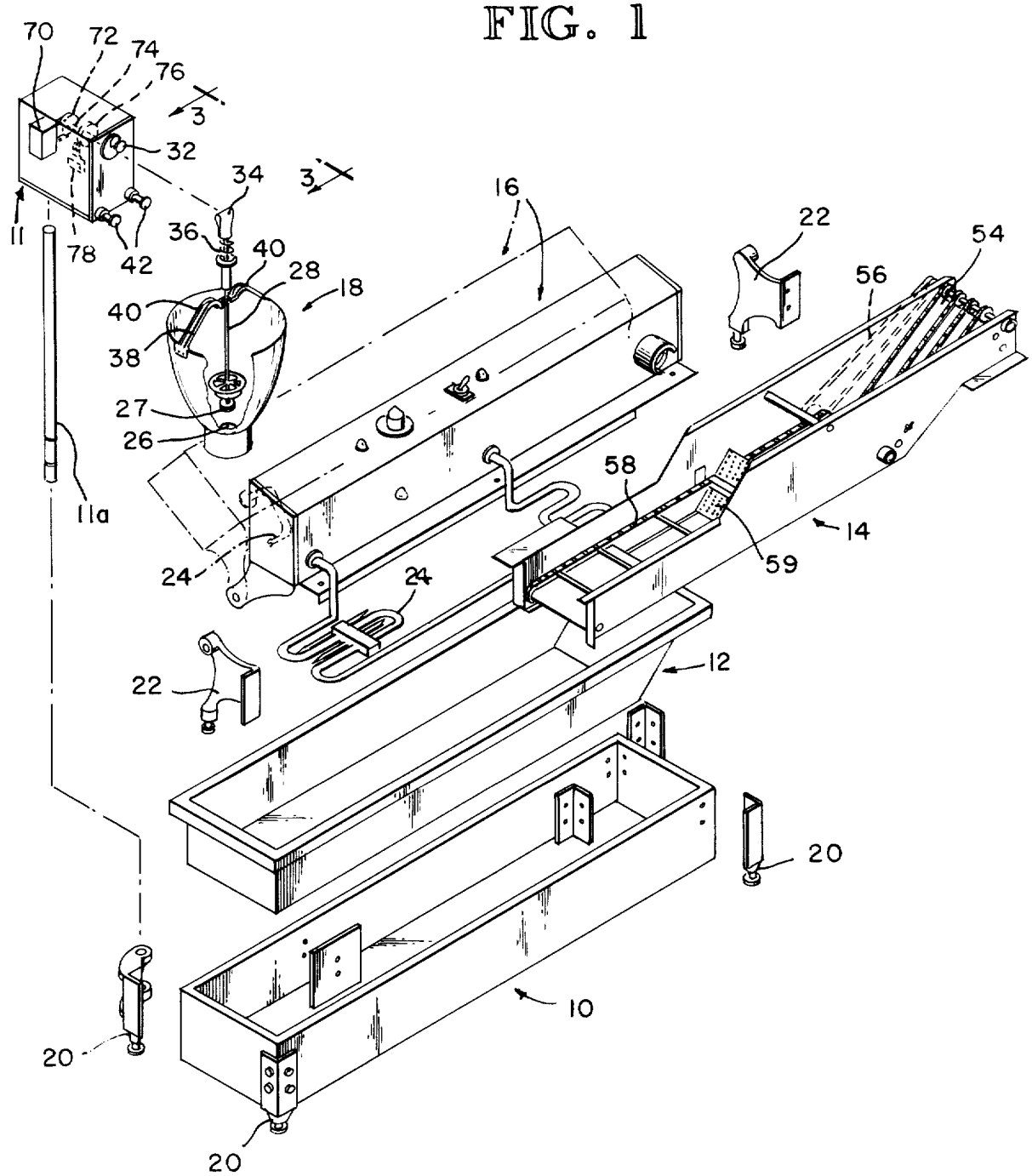
FIG. 1 is an exploded perspective view with parts broken away for clarity of a preferred embodiment of a doughnut machine embodying the principles of the invention.
Figure 2:
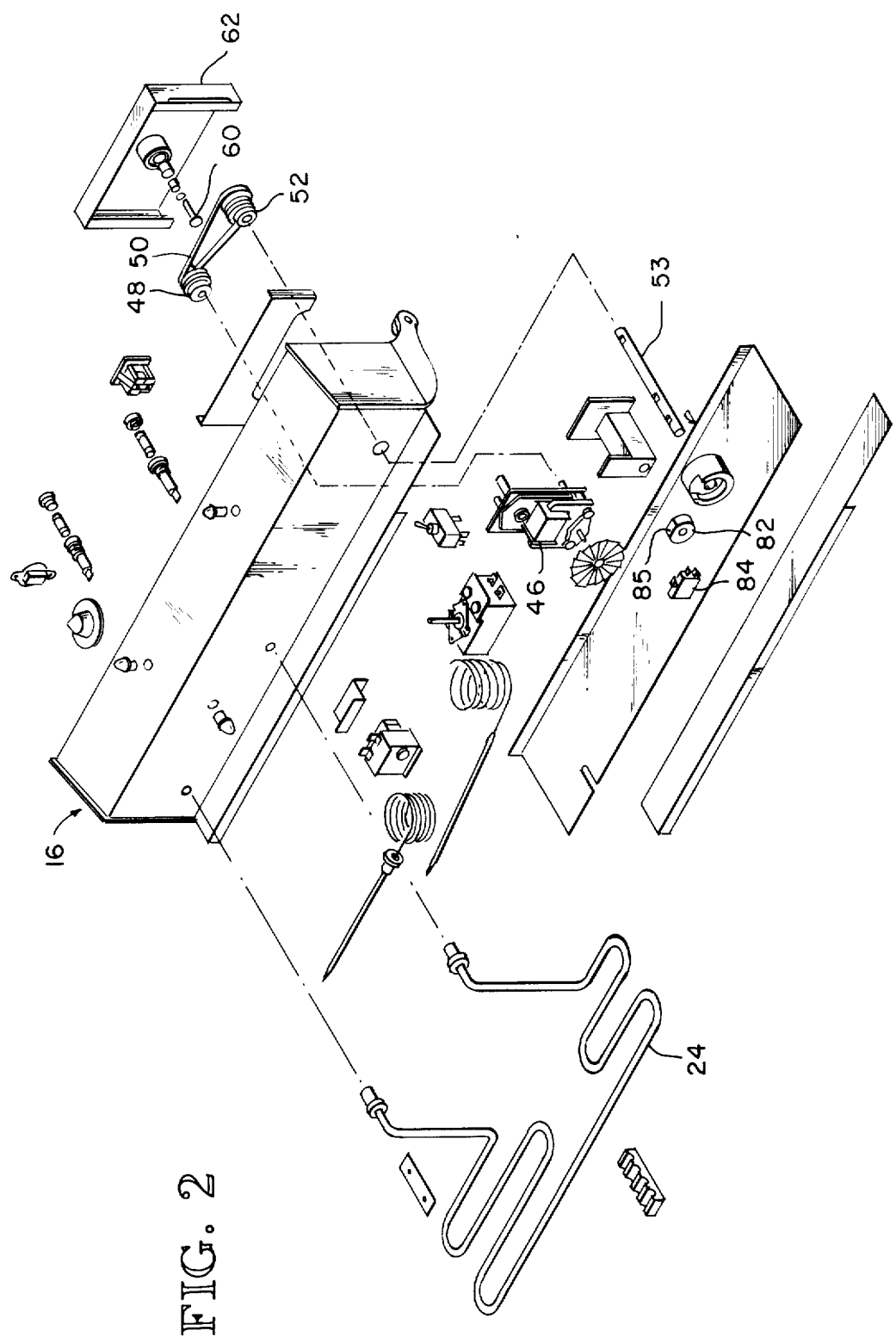
FIG. 2 is an exploded perspective of the remainder of the machine shown in FIG. 1.

As best shown in FIGS. 1 and 2, the doughnut frying machine includes a base 10, a removable hot frying liquid tank 12 seated in said base, a conveyor assembly 14, a heater assembly 16 and a batter hopper and cutting assembly 18. Batter is placed in the hopper 18, doughnuts are extruded in timed relation into the frying tank, are carried by the conveyor through the hot liquid until the desired cooking time is reached and then are carried out of the discharge or right-hand end of the conveyor as shown in FIG. 1.

The base 10 is provided with spaced adjustable support legs 20. The heater assembly 16 is pivotally mounted to separate auxiliary support legs 22 which are secured to the base 10 as well. The heater housing has conventional heater circuitry and a heating element 24 which is aligned to sit adjacent the bottom of the tank 12 submerged in hot liquid when the housing 16 is in the solid line position as shown in FIG. 1. The heater housing and its components, which in the preferred embodiment is uniquely provided with the drive motor and gear box for the conveyor assembly 14, comprises considerable weight. It is thus a unique feature of this invention that the auxiliary support legs serve as an outrigger for increasing the stability of the frying machine when the heater housing is rotated into the phantom line position shown in FIG. 1 for removal of the heating elements 24 from the tank 12. This simple one-step pivotal operation facilitates cleaning or removal of the tank 12; but since the tank is frequently still filled with hot liquid, it is very advantageous that the machine remain stable at all times during cleaning.

The hopper 18 is provided with a doughnut opening 26, a cutting head piston 27 which is connected to a center plunger or piston rod 28. As is well known, reciprocation of the piston 27 out of the opening 26 forms or cuts a doughnut. It is a unique feature of this invention that the hopper is completely and easily removable from the machine and is equally easily replaceable in driving engagement with the cutting head drive without time-consuming adjustments or removal of fasteners or the like. For this purpose the cutting machine is provided with a stand 11, which includes a post 11a and mounts a cutting drive head 30 having a motor driven eccentric cam 32. The piston rod 28 is provided with a cam follower 34, which as best shown in FIGS. 3A and 3B is of a curvature which can be rocked about the eccentric cam 32 for removal of the hopper. A compression spring 36 biases the cam follower 34 upwardly into engagement with the eccentric cam 32 and accordingly closes the opening 26 with the piston 27.

The hopper is provided with a handle or bracket 38 having spaced recesses 40 that fit on a set of lugs 42 secured to the cutting head 30. These lugs 42, recess 40, cam follower 34 and cam 32 are all pre-positioned so that by merely placing the hopper bracket on the lugs 42 the exact accurate stroke of the piston 27 is assured without further adjustment. Thus, as is readily apparent it is a quick and simple operation merely to lift up on the hopper to disengage the recesses 40 from the lugs 42, swing the hopper counterclockwise as viewed in FIG. 3A, into the position shown in FIG. 3B where the hopper can then be removed for cleaning or for refilling with batter. Installation in driving engagement is the opposite.

As best shown in FIGS. 2 and 4, the heater housing 16 is provided with a drive motor 46 which powers a multistepped driven pulley 48, thence through a conventional cogged drive belt 50, which then drives a multistepped driven pulley 52. Driven pulley 52 is connected through shaft 53 to the slanted out-feed conveyor 54 (FIG. 1). A drive chain 56 (hidden lines) connects the out-feed conveyor 54 to the horizontal run of the conveyor 58 which includes a conventional flipper 59 for flipping the doughnuts over as they travel through the frying liquid as is well known. A unique feature of this invention is that the drive from the motor 46 to the output shaft 53 has a safety cut-out device which allows the conveyors 54 and 58 to stop in case of a jamming without burning up the drive motor or overstressing the conveyors or drive elements of the conveyors. As best shown in FIG. 4, this safety cut-out device includes a tensioning roller 60 which is rotatably mounted in a weighted cover plate 62. The cover plate slides in guides in the heater housing 16 with the weight of the plate pushing the tensioning roller into the solid line position shown in FIG. 4 to increase the amount of wrap on the driven pulley 52. The belt 50 is normally very loosefitting on the pulley so that it requires increasing the wrap by depressing the upper run of the belt 50 to obtain a driving connection between the driving pulley 48 and the driven pulley 52. When a jam occurs, the pulley 52 stops, the cogs between the belt 50 and the pulley 52 try to disengage, which causes the upper run of the belt 60 to rise against the pressure of the tensioning roller 60, decreasing the wrap on the driven pulley 52, allowing the cogs to disengage with a chattering noise. The chattering noise advantageously serves as a signaling device to the operator that a malfunction has occurred and requires attention.

It is also important in a doughnut machine that in case of a jam the cutter head does not continue to cycle, thus dropping too many doughnuts into the fryer where they will become clogged, necessitating shutdown of the machine and a thorough cleaning. This is particularly necessary in a machine where the drive components and safety cut-out device for the conveyors are housed within an enclosed heater housing, since the malfunction is not as likely to be detected. The basic circuitry for operating the cutting head, the conveyor and for assuring that the cutting head does not continue to cycle during a jam of the conveyor is best shown in FIG. 5. A motor 70 drives a shaft 72 which has a cam 74 provided with a depression 76. The shaft 72 is coupled to the eccentric cam 32. A microswitch 78 rides on the cam 76. When the switch contact falls into the depression 76, the motor 70 is de-energized and the piston stops and seals the opening 26. Meanwhile, the conveyor motor 46 is continually turning. A cam 82 is rotated by the motor 46 and a microswitch 84 rides on the cam. The cam moves the contact from line a to line b when the switch contact engages a depression 85 on the cam 82, sending a current pulse through line b (FIG. 5) to the normally open contact of switch 78. Since the contact of 78 is also in its depression and the switch contact is in the normally open position, this provides a current path to energize motor 70 for a short pulse to move the cam 74 and move the contact of the microswitch 78 out of the depression 76 to the normally closed position, as shown in FIG. 5. Meanwhile, microswitch 84 has closed to send a current through line a. With the current path restored through the normally closed position of switch 78, the motor again begins to cycle until the switch contact 78 again reaches the depression 76, moving contact 78 to the normally open position to the right in FIG. 5 and de-energizing the motor 70. As is readily apparent, if a jam occurs in the conveyor, the cam 82 stops rotating, thus the microswitch 84 contact never returns to the normally open position, and the motor, once a cycle is completed in the cutting head, cannot recycle until the jam is cleared and the depression 85 rotates into a position to move the contact to the normally open position in microswitch 84. This condition assures that the cutter head will complete a cycle but stop after that completed cycle in the event of a jam in the conveyor.

Figures 6, 7:
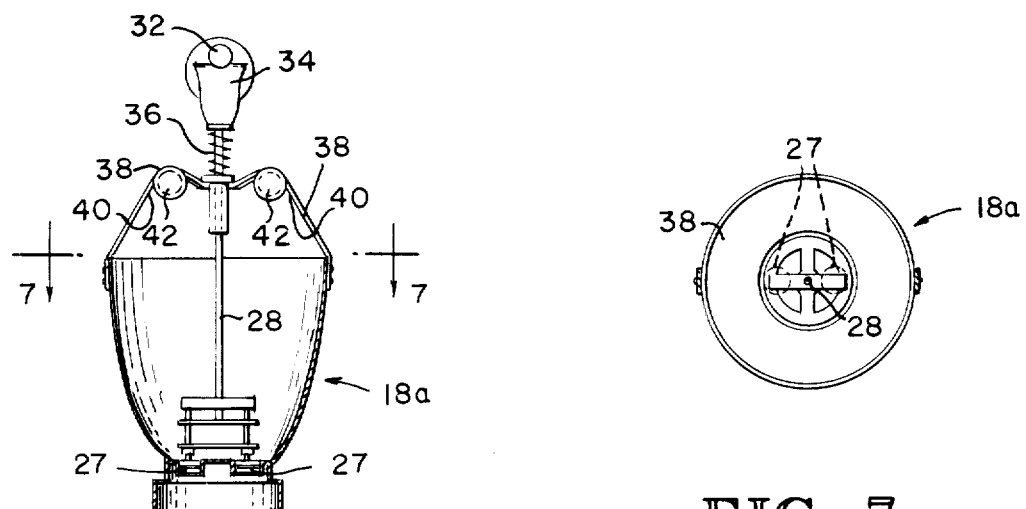
FIG. 6 is a vertical section of a multiple cutter and hopper.
FIG. 7 is a view taken along line 7—7 of FIG. 6.

As best shown in FIGS. 6 and 7, a double cutting head is provided with two pistons 27 coupled to a common piston rod 28 which moves in a hopper 18A, as in the preferred embodiment. The hopper, of course, in the double cutting head has two doughnut forming openings 26 rather than a single opening but in all other respects operates as in the single cutter embodiment and is otherwise conventional.

While the preferred embodiments of the invention have been illustrated and described, it should be understood that variations will be apparent to one skilled in the art without departing from the principles herein. It is also recognized that some of the features herein disclosed are in themselves unique components and in combination herein provide an advantageous, compact, easily used machine for smaller production quantities of doughnuts. Accordingly, it should be understood also that the invention is not to be limited to the specific embodiments illustrated in the drawing.

We claim:

1. In a doughnut frying machine of the type having a hopper, a cutter for forming doughnuts, a hot liquid frying tank, a conveyor for carrying the doughnuts through the frying tank, cutter drive means, conveyor drive means and control means for actuating the cutter and conveyor drive means, the improvement comprising:
   - a hopper stand adjacent one end of said frying tank, said cutter drive means located on said hopper stand for operating said cutter, hopper support means on said stand a predetermined distance from said cutter drive means;
   - said hopper including bracket means releasably engaged by said hopper support means for accurately removably locating said hopper on said stand;
   - said hopper having a doughnut dispensing opening, said cutter including a piston for closing and opening the dispensing opening, said piston including rod means releasably engaged by said cutter drive means for actuating said piston to dispense the doughnuts; and
   - wherein said hopper is easily removed from said stand for filling and/or cleaning by releasing said hopper bracket means and said rod means and is restored to its operating position on the stand without adjustments.

2. The machine of claim 1, said hopper bracket means including guide recesses spaced equidistantly on either side of said rod means, said hopper support means including a set of pegs aligned beneath said recesses for carrying said bracket means.

3. The machine of claim 1, said rod means including a cam follower having an upper surface, said cutter drive means including an eccentric crank engaged by said cam follower, the distance between the cam follower upper surface and said hopper support means determining the downward stroke of said piston upon one revolution of said eccentric crank, and spring means biasing said cam follower upwardly against the eccentric crank for returning said piston upwardly.

4. The machine of claim 3, said hopper bracket means including guide recesses spaced equidistantly on either side of said rod means, said hopper support means including a set of pegs aligned beneath said recesses for carrying said bracket means.

5. The machine of claim 1, said hopper including multiple spaced doughnut forming openings, said cutter including a piston for each opening and joined for movement with said rod means for forming multiple doughnuts with each stroke of said rod means.

6. A safety cut-out clutch for a drive belt running between a drive member and a driven member, comprising:
   - a drive belt loosely entrained around said members;
   - a tensioning roller for pressing on a run of said belt between said members to cause said belt to frictionally power the driven member;
   - means releasably biasing said roller against said belt; and
   - said releasable biasing means applying a predetermined biasing force for limiting the torque transfer between said members whereby the tensioning roller moves externally outwardly during overload, allowing the belt to slip, and wherein said belt is a cogged belt and said members are cogged members, and wherein the overload of said belt results in a chattering noise from said cogs slipping for signalling when an overload has occurred.

7. The cut-out device of claim 6, said releasably biasing means including a cover plate, said tensioning roller being on said cover plate and wherein the biasing means includes the weight of said cover plate.

8. The cut-out device of claim 6, including a doughnut frying machine having a cutting head, first drive means for said cutting head, a frying tank, a conveyor in said tank, second drive means for said conveyor and a control system for said cutting head and conveyor driving means, and wherein said control system includes first switch means for signalling a belt overload and second switch means for signalling a cutting head cycle completion, and an electrical cut-out circuit for precluding repetitive cycling of said cutting head during a conveyor overload condition.

9. A doughnut frying machine of the type having a hopper, a cutter for forming doughnuts, a hot liquid frying tank, a conveyor for carrying the doughnuts through the frying tank, cutter drive means, conveyor drive means and control means for actuating the cutter and conveyor drive means, the improvement comprising:
   - a heater housing adjacent the frying tank, heater elements extending out of the heater housing and into the tank;
   - a drive motor for said conveyor; and
   - a safety cut-out clutch between said motor and conveyor for disengaging the conveyor from the drive motor upon a conveyor overload condition, said drive motor for said conveyor being fixed within said heater housing and having a driven coupling connectable with said conveyor and located within said frying tank, whereby the motor drive and thus said conveyor are aligned by the heater housing in correct position relative to the heater elements and the tank.

10. The machine of claim 9, said cutter and conveyor drive means including an anti-doubling circuit for precluding a recycling of the cutter head when the conveyor is in an overload condition.

11. A doughnut frying machine of the type having a hopper, a cutter for forming doughnuts, a hot liquid frying tank, a conveyor for carrying the doughnuts through the frying tank, cutter drive means, conveyor drive means and control means for actuating the cutter and conveyor drive means, the improvement comprising:
   - a base;
   - a heater housing adjacent said base;
   - said frying tank removably fitted within said base, heating elements extending from said heater housing into said tank; and
   - means for pivotally mounting said heater housing on said base for movement of said heater elements out of said tank, said base having four widely spaced, generally rectangularly arranged support legs, said means for pivotally mounting the heater housing having a set of widely spaced auxiliary support legs positioned laterally of the base for supporting the weight of the heater housing when the heater elements are pivoted out of said tank, whereby the tank and hot frying liquid remain stable regardless of the pivoted position of the heater housing.

* * * * *